US012649270B2

(12) United States Patent
Tong et al.

(10) Patent No.: US 12,649,270 B2
(45) Date of Patent: Jun. 9, 2026

(54) SYSTEMS AND METHODS WITH LATTICE STRUCTURES FOR CONNECTING MATERIALS DURING MOLDING

(71) Applicant: GM GLOBAL TECHNOLOGY OPERATIONS LLC, Detroit, MI (US)

(72) Inventors: Stanley Tong, Royal Oak, MI (US); Daniel Peter Schuller, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 272 days.

(21) Appl. No.: 18/335,341

(22) Filed: Jun. 15, 2023

(65) Prior Publication Data

US 2024/0416566 A1 Dec. 19, 2024

(51) Int. Cl.
*B29C 45/14* (2006.01)
*B29L 31/00* (2006.01)

(52) U.S. Cl.
CPC ... *B29C 45/14819* (2013.01); *B29L 2031/772* (2013.01)

(58) Field of Classification Search
CPC .............. B29C 45/14; B29C 45/14344; B29C 45/1436; B29C 45/14967; B29C 45/14819
See application file for complete search history.

(56) References Cited

U.S. PATENT DOCUMENTS

| | | | | |
|---|---|---|---|---|
| 2020/0254661 A1* | 8/2020 | Moarefi | ............... | B23K 26/342 |
| 2021/0024255 A1* | 1/2021 | Zumbrum | .............. | B33Y 80/00 |

FOREIGN PATENT DOCUMENTS

| | | |
|---|---|---|
| DE | 102015104830 A1 | 9/2016 |
| EP | 0628675 A1 | 12/1994 |
| NZ | 268004 A | 7/1997 |

* cited by examiner

*Primary Examiner* — Yunju Kim
(74) *Attorney, Agent, or Firm* — Ingrassia Fisher & Lorenz, LLP | IF&L

(57) ABSTRACT

Systems and methods for manufacturing a product include at least one fabricating system to create a substrate with a lattice structure. A form receives the substrate. The form defines a cavity around the substrate. A forming system delivers a material into the cavity of the form so that the material flows into the lattice structure interweaving the material with the substrate to create a feature on the substrate from the material that is locked to the substrate by the lattice structure.

17 Claims, 4 Drawing Sheets

SYSTEMS AND METHODS WITH LATTICE STRUCTURES FOR CONNECTING MATERIALS DURING MOLDING

INTRODUCTION

The present disclosure relates to manufacturing systems and methods for securing one part of a product (a base part), to another part of the product (a molded part) that is created by a mechanism that flows a material onto the base part, and more particularly relates to using lattice structures to securely connect a formed material to a substrate.

The strength of the connection between two components of a product is important when the product is subjected to various forces and stresses. For example, molding, casting or otherwise forming one part of the product over or onto another part of the product may rely on friction or a limited interference fit to hold the two component parts together.

Various types of manufacturing processes exist to create or modify products. Printing technologies have come into widespread use due to their desirable qualities such as efficiency and flexibility. Various types of 3D printing technologies have been developed for creating objects from metal, ceramic and polymer materials. The various 3D printing technologies each generally includes a build surface, a material delivery system, an energy delivery system, and a control system. The build surface provides a reference surface upon which the material is deposited, layer-by-layer to successively build up the part according to design details. The material delivery system performs the depositing of a feedstock material, such as in a particle, fiber, or filament form, for fusing with the previously deposited layer. The energy delivery system adds energy to the feedstock material before, during and/or after deposition for liquifying/fusing the material into the part being created. The control system operates each of the other systems in building the object being created, such as according to math data definition.

Both traditional manufacturing processes and printing processes may be used in a variety of applications to achieve desired results. However, improving the strength of the interface between two parts of a component where one part is formed onto, around or into the other part by a mechanism that flows the material of the one part relative to the other part remains an objective.

Accordingly, it is desirable to provide improved methods and systems for securing one part of a component to another part of the component. Furthermore, other desirable features and characteristics of the present disclosure will become apparent from the subsequent detailed description and the appended claims, taken in conjunction with the accompanying drawings and the foregoing technical field and background.

SUMMARY

Systems and methods for manufacturing a product include at least one fabricating system to create a substrate with a lattice structure. A form receives the substrate. The form defines a cavity around the substrate. A forming system delivers a material into the cavity of the form so that the material flows into the lattice structure interweaving the material with the substrate to create a feature on the substrate from the material that is locked to the substrate by the lattice structure.

In additional embodiments, the lattice structure includes a series of cells. Each cell is formed by a number of structural members that connect at nodes and that define open spaces between the structural members.

In additional embodiments, the feature is a molded part on the substrate.

In additional embodiments, the lattice structure includes a number of interconnecting structural members, and the material is embodied as a number of elements extending through the number of interconnecting structural members.

In additional embodiments, the lattice structure includes a number of structural members that connect at nodes and that define open spaces between the structural members. The material completely fills the open spaces.

In additional embodiments, the forming system is an injection molding machine.

In additional embodiments, the lattice structure is an integral part of the substrate.

In additional embodiments, the lattice structure includes a number of structural members that are load carrying parts of the lattice structure.

In additional embodiments, the material is embodied as elements that fill spaces in the lattice structure.

In additional embodiments, the lattice structure defines open spaces, and the lattice structure is designed to maximize permeation of the material into the open spaces.

In a number of other embodiments, a method for manufacturing a product includes fabricating, by at least one fabricating system, a substrate with a lattice structure. The substrate is received in a form. The form defines a cavity around the substrate. A forming system delivers a material into the cavity of the form, including flowing the material into the lattice structure. During the flow of the material, it is interweaved with the substrate to create a feature on the substrate from the material, and the material is locked to the substrate by the lattice structure.

In additional embodiments, the lattice structure is fabricated as a series of cells. Each cell includes a number of structural members that connect at nodes and that define open spaces between the structural members.

In additional embodiments, the feature is created as a molded part on the substrate.

In additional embodiments, the lattice structure is fabricated as a number of interconnecting structural members. The material is formed as a number of elements extending through the number of interconnecting structural members.

In additional embodiments, the lattice structure is fabricated as a number of structural members that connect at nodes and that define open spaces between the structural members. The material is delivered to completely fill the open spaces.

In additional embodiments, the forming system includes an injection molding machine.

In additional embodiments, the lattice structure is fabricated as a part of the substrate with open spaces. The lattice structure is designed to maximize permeation of the material into the open spaces.

In additional embodiments, the lattice structure is fabricated as a number of structural members that are load carrying parts of the lattice structure.

In additional embodiments, the lattice structure is filled with elements of the material.

In a number of additional embodiments, a product includes a substrate that has a lattice structure. A feature is formed in a cavity of a forming system by a material that is disposed on the substrate. The material is interweaved with the lattice structure so that the feature is locked to the substrate by the lattice structure.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, summary or this detailed description.

Figure 1:
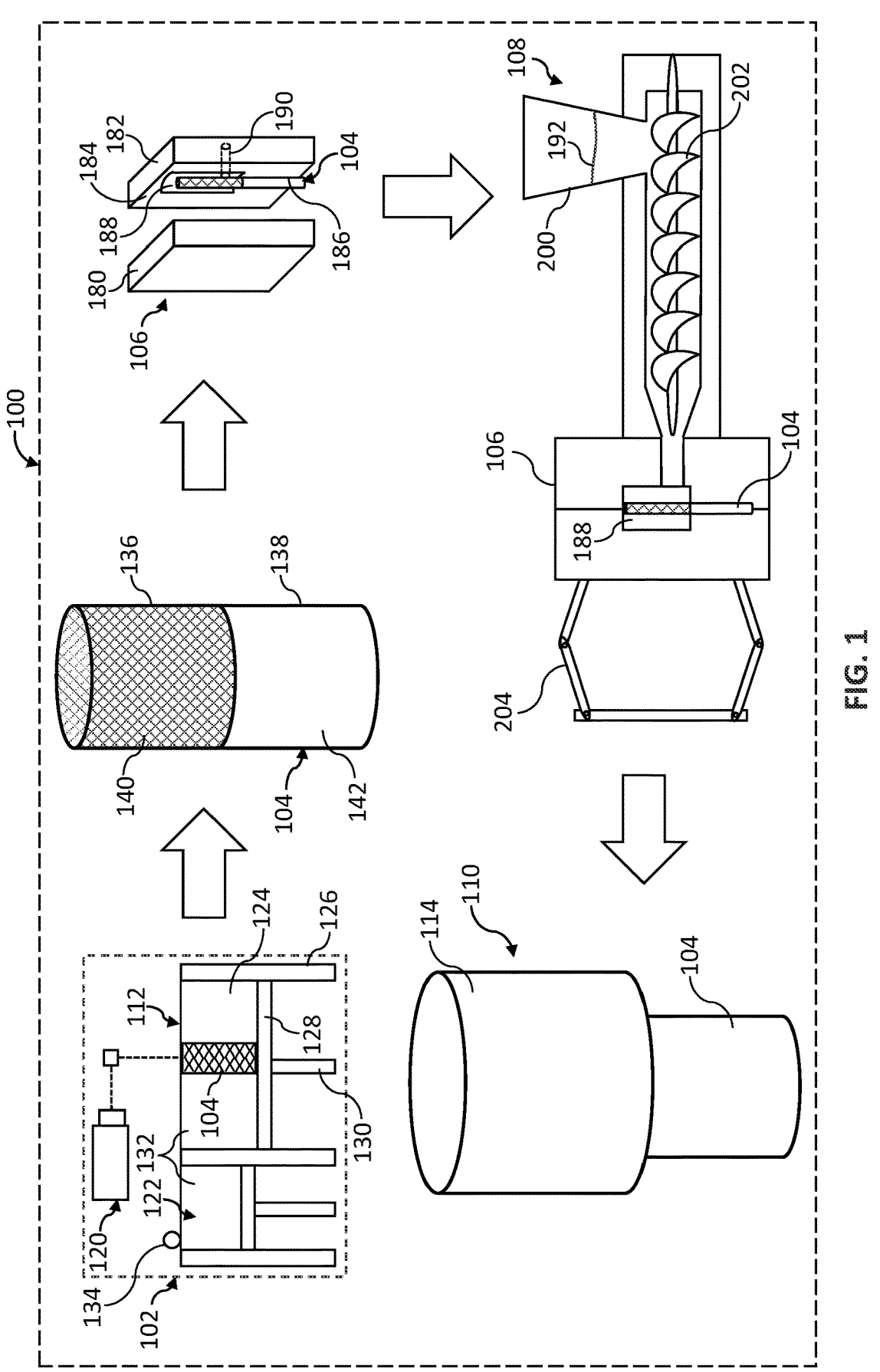
FIG. 1 is a schematic diagram of a manufacturing system in the process of building a product, in accordance with various embodiments.

Referring to FIG. 1, a manufacturing system 100, is schematically illustrated. In general, the manufacturing system 100 includes a fabricating system 102, a substrate 104, a form 106, a forming system 108 and a product 110, which includes the substrate 104 and a feature 114 connected with the substrate 104. The fabricating system 102 may be any of a variety of object creation systems that may operate to create or modify a workpiece, that in the current embodiment is the substrate 104, or at least a part thereof. The fabricating system 102 may employ any of a variety of operations such as machining, casting, molding, shaping, deforming, bending, piercing, drilling, stamping, cutting, additive manufacturing, 3D printing, etc. In the current embodiment the fabricating system 102 includes a printing system 112, such as a laser powder bed fusion based machine. In other embodiments, another printing technology may be used such as binder jetting, powder bed fusion with electron beam, material extrusion/FDM, high-speed sintering, selective laser sintering, multi-jet fusion, or another printing technology.

In embodiments, the printing system 112 includes an energy delivery system in the form of an energy source 120, which may be of the heat producing type, a material deposition system in the form of a material depositor 122, a build chamber 124 defined by a build box 126, and a build platform 128 with an elevator 130. In a number of embodiments, a gas delivery system (not shown), may be included for delivery of an inert gas to the build chamber 124 to provide a favorable environment for the build. The material depositor 122 may be any mechanism to distribute a material 132, from which the substrate 104 is formed, such as a roller, brush, blade, spreader, sprayer, feeder, or others.

In the current embodiment, the printing system 112 is illustrated as employing a powder bed fusion type additive manufacturing/3D printing technology. In other embodiments, the additive manufacturing cell 100 may be configured for or another type of additive manufacturing. It will be appreciated that the substrate 104 being printed may be built of a material that is, or includes, one or more of a metal, a ceramic, a polymer, or other material.

Accordingly, the 3D printing approach selected may be tailored to the material(s) selected for forming the substrate 104. In other embodiments, additive manufacturing may not be used, or may be used only in part, and conventional machining/forming technologies may be employed. For example, the substrate 104 and/or the lattice structure 140 may be created by any material forming operations.

In the current embodiment, the printing system 112 is configured for the application of a powder form of the material 132 by the material depositor 122. The melting/fusing of the material 132 is selectively performed by the energy source 120 via a controlled exposure. The material 132 is applied by a spreader 134 of the material depositor 122 in a series of successive layers onto the build platform 228. The substrate 104 is successively built up in layers on the build platform 128, which moves during the build via the elevator 130. When the forming process for a given layer is completed, the build platform 128 may be lowered by the amount of the layer thickness and the next material layer may be applied. This process is repeated until the entire design geometry of the substrate 104, or the designated part thereof, is generated.

In various embodiments, the substrate 104 that is being built by the fabricating system 102 (in the current embodiment the printing system 112) may be a part of another product 110 that includes other physical parts, such as the feature 114. The part of the product 110 (substrate 104) may be referred to as a "substrate" because it is formed and then another part (feature 114) of the product 110 is formed onto, over, around and/or into, the substrate 104. The substrate 104 is formed with a segment 136 and another segment 138. The segment 136 and the segment 138 have differences in the current embodiment. For example, the segment 136 has a lattice structure 140 and the segment 138 does not. In other embodiments, the segment 138 may also include a lattice structure, such as the lattice structure 140. In some embodiments, the lattice structure 140 may extend completely through the segment 136 and/or the segment 138. In some embodiments, the lattice structure 140 may only exist on the surface 142 of the segment 136 and/or of the segment 138. In additional embodiments, the entire surface 142 of both segments 136, 138 may include the lattice structure 140. In some embodiments, the lattice structure 140 may be formed in an opening into the substrate 104, such as to connect the feature 114 to the substrate 104 within an opening thereof. In general, the lattice structure 140 may be included on any area of the substrate 104 where bonding with another part, such as the feature 114 is desired.

Figure 2:
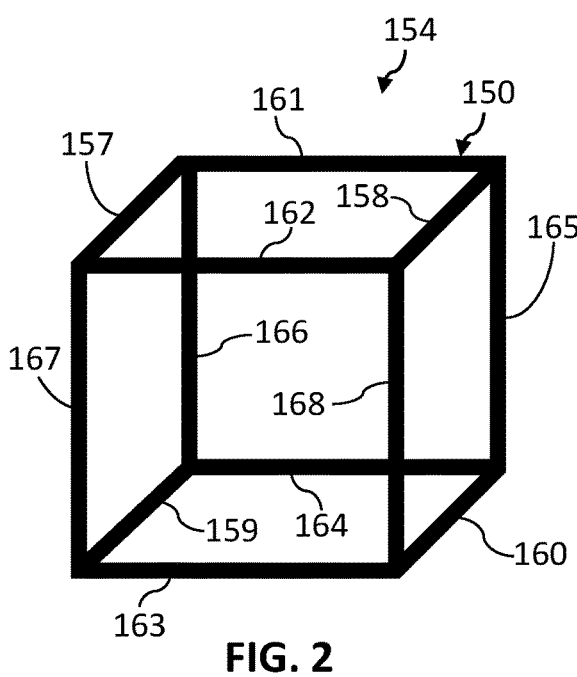
FIG. 2 is a schematic diagram of a lattice structure cell produced as part of the manufacturing system of FIG. 1, in accordance with various embodiments.
Figure 3:
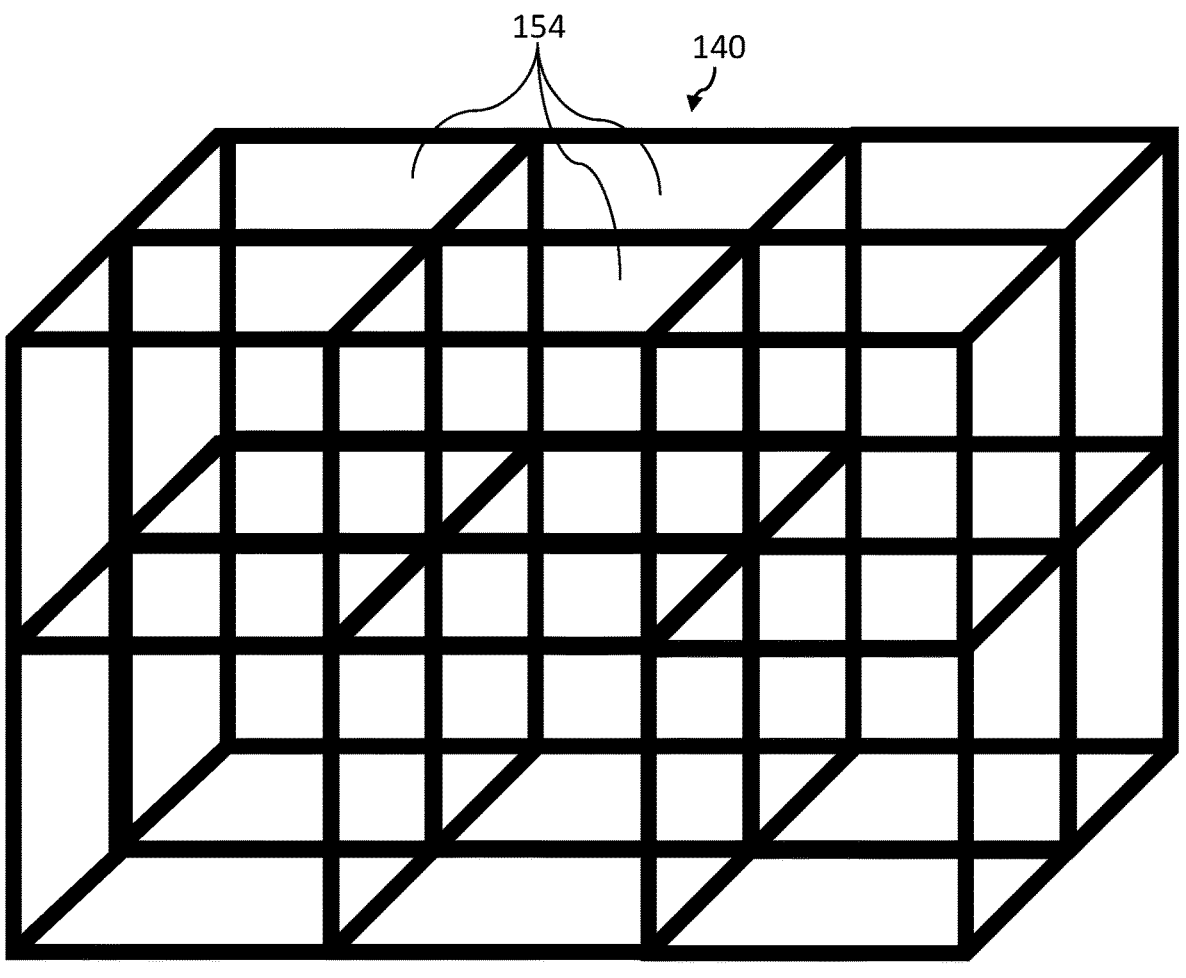
FIG. 3 is a schematic diagram of a lattice structure with plural cells produced as part of the manufacturing system of FIG. 1, in accordance with various embodiments.

Referring to FIG. 2 and FIG. 3, along with FIG. 1, the lattice structure 140 will be described in more detail. In general, the lattice structure 140 includes an architecture with components referred to as structural members 150 that interconnect with one another to define spaces 152, that are open between the structural members 150 in two or three dimensions, or in what some may refer to as 2.5 dimensions. The structural members 150 are in general, physical, load carrying parts of the lattice structure 140. The lattice structure 140 may fill a volume, such as of the segment 136 or may conform to a surface, such as the surface 142. The lattice structure 140 may be a configuration based on repeating unit cells composed of either specific shapes or random patterns in a web of any level of intricacy or simplicity. The repeating unit cells may have any physical size tailored to the application. The lattice structure 140 may be periodic, non-periodic or random. In general, the lattice structure 140 includes the structural members 150 in any shape to define the open spaces 152 for receipt of an intervening material.

The lattice structure 140 may be cellular, with one cell 154 illustrated in FIG. 2 and six interconnected cells 154 shown in FIG. 3. In this example the cells 154 are cubic. Each cell 154 has twelve structural members 150, designated as members 157-168. Each of the members 157-168 is formed as a beam and the members 157-168 of the one cell 154 connect at nodes 171-178. In other embodiments, the members 157-168 may be beams, surfaces, plates, trusses, cells, webs, nodes, struts, that fit together following an ordered, repeating, or random pattern. The members 157-168 may be interlocking, interwoven, interlinked, or otherwise interconnected patterns of material to form the lattice structure 140. In other embodiments, rather than being cubic, the cells 154 may be triangular, star, octet, hexagonal, diamond, tetrahedron, gyroid, pyramid, body centered cubic, spiral, or in any configuration that includes members, such as the structural members 150 and that defines open spaces, such as the spaces 152.

Referring again to FIG. 1, the form 106 may be any of a variety of structures configured to receive the substrate 104 and enable directing the flow of a material at the substrate 104 to form the feature 114. The form 106 may be a mold, a die, or any tool that serves the purpose of forming the feature 114 in a way that connects with the substrate 104. The form 106 may be configured for injection molding. In the current embodiment, the form 106 includes a section 180 that joins with a section 182 at a parting line 184 to define a seat 186 and a cavity 188. The seat 186 is a space that receives and/or holds the substrate 104 in a disposition so that the lattice 140 extends into the cavity 188. The cavity 188 defines an open volume into which a material may be directed to create the feature 114. The form 106 includes a passage 190 through which the material of the feature 114 may be directed under force into the cavity 188.

The form 106 is used in the forming system 108. The forming system 108 may be any of a variety of systems that enable forming the feature 114 in a desired shape onto and/or into the substrate 104. The feature 114 is formable because the forming system 108 accepts a material that flows or initiates melting of the material 192, which enables the material's introduction into the cavity 188 to form the feature 114. The composition of the material 192 is formulated to directed into the cavity 188 or to respond to the applied energy by melting and flowing into the cavity 188 to form a continuous structure of the feature 114. Due to the properties of the material 192, flowing in a consistent and predictable way is accomplished by a defined preparation of the material 192 for the forming system 108, such as a molding machine, referred to a forming system 108.

In the current embodiment, the forming system 108 is an injection molding system that has a hopper 200 for introduction of the material 192 an injection unit 202 for melting and moving the material 192, the form 106, and a clamp 204 for opening and closing the form 106. The injection unit 202 moves the material 192 through the passage 190 and into the cavity 188 to form the feature 114. After forming in the forming system 108, the product 110 includes the substrate 104 with the with the feature 114 integrated with the substrate 104.

Figures 4, 5:
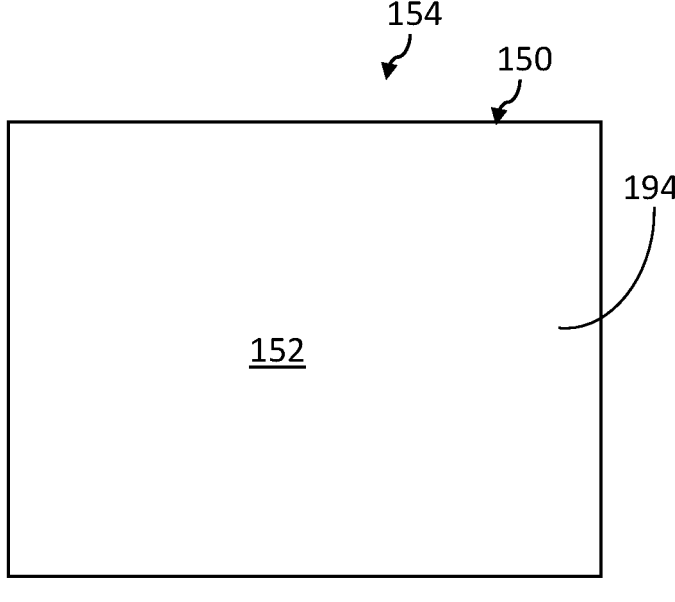
FIG. 4 is a schematic diagram of a part of the lattice structure of FIG. 3, in accordance with various embodiments.
FIG. 5 is a schematic force diagram on a part of the lattice structure of FIG. 3, in accordance with various embodiments.

Referring to FIG. 4, during the forming in the material 192 flows around the structural members 150 into the spaces 152 and the material 192 forms elements 194 that fill the spaces 152. The flow of the material 192 fully impregnates the spaces 152 of the lattice structure 140 with the elements 194 interweaving with the structural members 150. After forming the material 192 solidifies in the spaces 152 as the elements 194 locking the feature 114 to the substrate 104. As a result, in addition to surface level interaction, full integration and interaction of the material 192 with the lattice structure 140 results.

In an over-mold type process where one part is molded onto another with surface level interaction, only surface level friction/adhesion may hold two parts together. Friction force ($F_f$) is a function of the applicable coefficient of friction ($\mu$) and normal forces ($F_N$), which may be represented by the relation $F_f = \mu F_N$. Friction force tends to be low between a typical over-molded part and the part on which it is over-molded. For example, when the forces applied between the over-molded parts reach a slip threshold, they will move relative to one another. Where that movement is unwanted, it may be described as a failure of the involved product.

In embodiments, adhesion force ($F_a$) may also apply, depending on the materials used. Adhesion force is proportional to contact surface area (A), which may be represented by the relation $F \propto A$. Adhesion occurs between two surfaces by bonding, which arises through a chemical action, such as when the chains of two polymers interlink, or where the materials experience another form of chemical reaction. With typical over-molded parts, such as a polymer molded on a metal, adhesion force is low. As a result, the sum of friction force and adhesions force delivers only a modest amount of force carrying capability.

In the current embodiment where full interaction of the material 192 with the lattice structure 140 occurs between the structural members 150 and the elements 194, the material of the feature 114 is interweaved with the material of the substrate 104. As a result, rather than relying on surface level friction/adhesion to hold the product 110 together, a large number of structural members 150 and elements 194 secure the product 110. Shear/tensile strength comes into play in retaining the feature 114 in place relative to the substrate 104. Any forces applied between the substrate 104 and the feature 114 are distributed over a large number of sites (the structural members 150 and the elements 194), and the average stresses on the material per unit area are low. This is because stress ($\sigma$) is a function of force (F) and area (A), where $\sigma = F/A$. Because in the current embodiment the total area is large due to the sum of all the structural members 150 and/or the elements 194, the average stress is relatively low, and product failure is avoided over a large bandwidth of stress.

Referring to FIG. 5, when stress is created between the components of the product 100 (the substrate 104 and the feature 114), the sum of the forces 210 on the feature 114 is offset by the sum of the forces 212 on the substrate 104. Because the forces 210, 212 are carried by the sum of all the areas of the structural members 150 and the elements 194 they are distributed over a large number of areas. The large number of areas results in a large total area on which the force is applied, resulting in low stress at each site in a two-three dimensional space. In embodiments where the material 192, which is molded, has a lower strength than the material of the substrate 104, the areas 152 may be designed substantially larger than the cross sectional area of the structural members 150. As a result, the stress on the material 192 in any of the given spaces 152 is low and the feature 114 is secured to the substrate 104 in an optimal way. In addition, because friction and adhesion strength is a function of surface area, the amount of force that the interface between the substrate 104 and the feature 114 is able to carry is also increased from the friction and adhesion perspective.

For example, friction/adhesion strength between the substrate 104 and the feature 114 may be optimized. Through physical, structural interference due to the lattice structure 140) and the interweaved material 192 between the substrate 104 and the feature 114, significantly higher normal forces are sustainable at the interface. In addition, the interweaved character of the substrate 104 and the feature 114 through the lattice structure 140 results in higher contact surface area and a higher load carrying capability due to friction and adhesion. In sum, the load carrying ability of the product 110 between the substrate 104 and the feature 114 is increased in three ways, including higher shear/tensile strength, higher friction strength and higher adhesion strength.

Referring again to FIG. 1, the product 110 leaving the forming system 108 includes the substrate 104 with the feature 114 fully integrated together. In addition to surface level interaction, there is a full interaction and integration of the substrate 104 and the feature 114 because the material 192 flows through the lattice structure 140 impregnating, touching, and bonding with, the entire lattice structure 114. The geometry of the lattice structure 140 with the spaces 152 enables the material 192 to flow through and interact with the structural members 150. The lattice structure 140 is configured to maximize permeation of the material 192 into the open spaces 152. The strength of the connection is not limited to the friction and shear force of the connection but also includes the area of the material 192 in the spaces 152 that distributes the forces/stress across multiple pieces with an equivalent cross sectional area that is very large relative to the surface interface between the substrate 104 and the feature 114.

Figure 6:
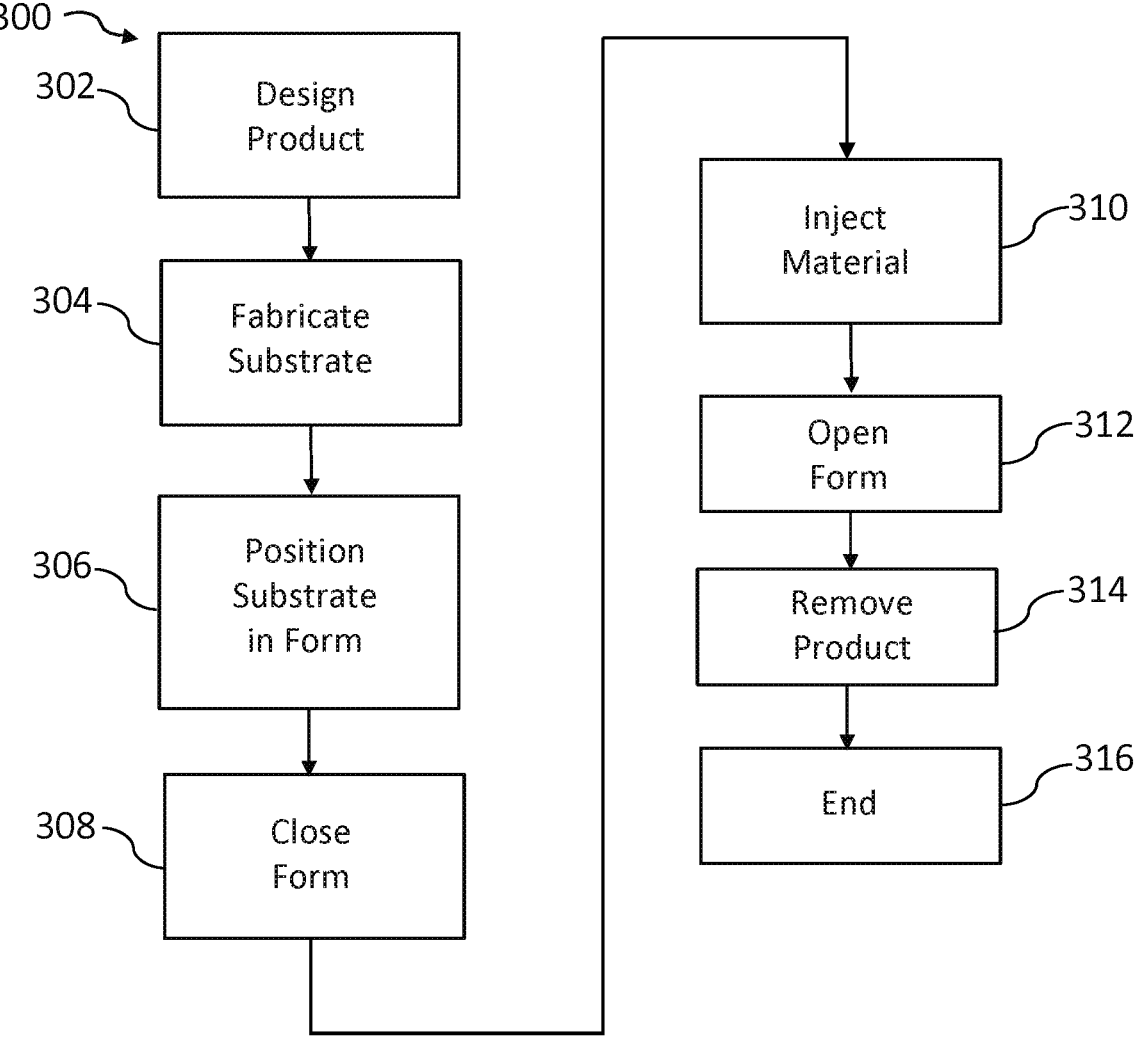
FIG. 6 is a flow chart of process for manufacturing a product using the system of FIG. 1 and the lattice structure of FIG. 2, in accordance with exemplary embodiments.

Referring to FIG. 6, a method 300 is illustrated for connecting components (such as the substrate 104 and the feature 114) with lattice structures, such as in molding operations. As will be appreciated in light of the disclosure, the order of operation within the method 300 is not limited to the sequential execution as illustrated in FIG. 6 but may be performed in one or more varying orders as applicable and in accordance with the present disclosure. The method 300 starts when an item, such as the product 110, is designed 302. The product 110 may include a substrate 104, or plural substrates 104, designed 302 for a purpose that may be functional and/or aesthetic. The substrate 104 may be designed for a purpose that may be functional and/or aesthetic. The substrate 104 may be a structural item, a tool, a body, a fastener, an enclosure, a locator, or an ornament, or any part that is desirably connected with another molded part. In general, the substrate(s) 104 is/are designed to be mated/connected with one or more other parts such as the feature 114. In some embodiments, there may be plural features 114. The feature(s) 114 may be a functional feature such as a handle, a wall, a cam, a lever, a torque transfer element, a beam, etc. and/or may be an aesthetic feature such as a panel, a figure, an ornament, or may be any object(s) that is/are desirably connected with the substrate 104. The substrate 104 and the feature 114 may be composed of any materials, whether common or different from one another. In the following description the substrate 104 and the feature 114 are described as singular, but in all examples either or both may be plural.

In sum, the substrate 104 and the feature 114 are designed to be connected together to form one product, such as the product 110, or to form one part of a larger product. Following the step of being designed 302, the substrate 104 may be fabricated 304, such as by the fabricating system 102. The substrate 104 is fabricated 304 with at least one section that includes a lattice, such as the lattice structure 140. The substrate 104 may be fabricated 304 by any means that results in the substrate 104 with the lattice structure 140. For example, the segment 136 with the lattice structure 140 may be fabricated 304 integral with the segment 138, or the segment 136 may be fabricated 304 separate from the segment 138 and the two segments 136, 138 may be joined together. The joining may be accomplished by means of fasteners, chemical bonding, welding, mechanical deformation, or any other joining method. In any case, the substrate 104 includes the lattice structure 140.

As fabricated 304, whether as an integral part or as a joined part, the substrate 104 includes one or more areas of the lattice structure 140. The lattice structure 140 is configured to be formed by the fabricating system 102. As part of the step of being designed 302, the details of the lattice structure 140 may be generated in a computer aided design (CAD) system and may be tuned. Properties of the lattice structure 140 (mechanical, thermal, etc.) are determined by lattice type and other design parameters such as unit cell size and thickness of members. The lattice structure 140 is optimized to maximize strength (shear/tensile and adhesion/friction), to address deformation mechanisms, to maximize surface area, to optimize cell size and density, to optimize thickness of members, cell orientation and other parameters.

The method 300 proceeds by positioning 306 the substrate 104 in the form 106. The form 106, such as within the forming system 108 (the molding machine), is closed 308 and the material 192 is forced 310, such as by injection, around the substrate 104 within the cavity 188. The material 192 flows around the structural members 150 and into the spaces 152. The lattice structure 140, such as by part of the step of being designed 302, may be configured to optimize flow of the material 192 within the cavity 188. Behavior of the material 192 in the form 106 may be considered as that of a liquid. The CAD system employed may use available fluid dynamics modelling software to consider the rheology including the direction of flow of the material 192 within the form 106, the temperature gradients within the form 106, the viscosity changes of the material 192 within the form 106, the flow rate gradients within the form 106, pressure changes within the form 106, surface interaction between the involved materials, and any other governing parameters to ensure complete integration of the material 192 into the lattice structure 140. In specific examples, the size of the areas 152 may be increased to reduce the amount of heat loss through the form 106 and increase the flow area as the material moves through the lattice structure 140. In other words, as the material 192 moves through the lattice structure 149, the size of the areas 152 for open flow are increased to maintain flow (e.g., downstream areas 152 are larger than upstream areas 152). The design ensures the material 192 completely fills the open areas 152.

With the material 192 fully integrated with the lattice structure 140, it solidifies within the form 106 and locks the feature 114 to the substrate 104. The solid form of the material 192 then exists within the lattice structure 140. The method 300 continues with opening 312 the form 106, removing 314 the product 110, for any needed post processing, and the method 300 ends 316.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for manufacturing a product, comprising:

a substrate that includes a first segment that includes a lattice structure and a second segment that does not include the lattice structure, wherein the substrate comprises a material configured to be printed;

at least one fabricating system configured to create the substrate with the lattice structure, wherein the first segment of the substrate defines a surface that extends completely around the first segment and that is configured to present a bonding area, and wherein the lattice structure is formed at the surface in an entirety of the surface by structural members;

a form, configured to receive the substrate, the form defining a cavity around the lattice structure of the substrate and the form defining a seat that receives and holds the substrate at the second segment with the substrate in a disposition so that the lattice structure extends into the cavity; and a forming system configured to deliver the material into the cavity of the form, so that the material flows into the lattice structure interweaving the material with the substrate to create a feature on the substrate from the material that is locked to the substrate at the bonding area by the lattice structure, with elements of the material filling voids between the structural members, wherein the forming system is configured to deliver the material to form the feature on the substrate, wherein the feature surrounds the surface and is bonded to the surface by the lattice structure, wherein the elements are larger in cross section than the structural members to manage stress on the material, wherein the lattice structure is configured so that forces applied between the substrate and the feature are distributed to the structural members and the elements providing shear and tensile strength in retaining the feature in place relative to the substrate, wherein the lattice structure comprises a series of cells, wherein each cell is formed by the structural members that connect at nodes and that define open spaces as the voids between the structural members, wherein the open spaces include flow areas for the material to move through the series of cells, wherein the flow areas have sizes that increase as the material moves through the lattice structure to reduce the amount of heat loss through the form and increase the flow areas as the material moves through the lattice structure, meaning downstream areas of the open spaces are larger than upstream areas of the open spaces in the series of cells.

2. The system of claim 1, wherein the feature comprises a molded part on the substrate.

3. The system of claim 1, wherein the structural members are interconnecting structural members and the elements extend through the interconnecting structural members.

4. The system of claim 1, wherein the structural members connect at the nodes and wherein the material completely fills the voids.

5. The system of claim 1, wherein the forming system comprises an injection molding machine.

6. The system of claim 1, wherein the lattice structure comprises an integral part of the substrate.

7. The system of claim 1, wherein the structural members are load carrying parts of the lattice structure.

8. The system of claim 1, wherein the lattice structure is configured, including being sized, based on a direction of flow of the material within the form, temperature gradients within the form, viscosity changes of the material within the form, flow rate gradients within the form, pressure changes within the form and surface interaction between the material and the lattice structure to ensure complete integration of the material into the lattice structure.

9. The system of claim 1, wherein the lattice structure is configured to maximize permeation of the material into the voids.

10. A method for manufacturing a product, comprising:

fabricating, by at least one fabricating system, a substrate with a lattice structure, the substrate including a first segment that includes the lattice structure and a second segment that does not include the lattice structure, wherein the substrate comprises a material configured to be printed, wherein the first segment of the substrate defines a surface that extends completely around the first segment and that is configured to present a bonding area, and wherein the lattice structure is formed at the surface in an entirety of the surface by structural members;

fabricating the lattice structure as a series of cells, wherein each cell includes the structural members that connect at nodes and that define open spaces between the structural members;

forming the open spaces to include flow areas for the material to move through the series of cells, and forming the flow areas have sizes that increase as the material moves through the lattice structure, reducing the amount of heat loss through the form and increasing the flow areas as the material moves through the lattice structure, meaning downstream areas of the open spaces are larger than upstream areas of the open spaces in the series of cells;

receiving the substrate in a form, the form defining a cavity around the lattice structure of substrate, the form defining a seat that receives and holds the substrate at the second segment with the substrate in a disposition so that the lattice structure extends into the cavity;

delivering, by a forming system, the material into the cavity of the form, including flowing the material into the lattice structure, interweaving the material with the substrate to create a feature on the substrate from the material, and locking the material to the substrate by the lattice structure at the bonding area;

delivering, by the forming system, the material to form the feature on the substrate, with the feature surrounding the surface and bonding to the surface by the lattice structure, structure;

providing elements of the lattice structure with larger cross sections than the structural members to manage stress on the material; and forming the lattice structure so that forces applied between the substrate and the feature are distributed to the structural members and the elements, providing shear and tensile strength in retaining the feature in place relative to the substrate.

11. The method of claim 10, comprising creating the feature as a molded part on the substrate.

12. The method of claim 10, comprising:

fabricating the structural members as a number of interconnecting structural members; and forming the elements to extend through the number of interconnecting structural members.

13. The method of claim 10, comprising:

delivering the material to completely fill the open spaces.

14. The method of claim 10, comprising configuring the forming system as an injection molding machine.

15. The method of claim 10, comprising:

configuring the lattice structure to maximize permeation of the material into the open spaces.

16. The method of claim 10, comprising fabricating the structural members as load carrying parts of the lattice structure.

17. The method of claim 10, comprising forming and sizing the lattice structure based on a direction of flow of the material within the form, temperature gradients within the form, viscosity changes of the material within the form, flow rate gradients within the form, pressure changes within the form and surface interaction between the material and the lattice structure to ensure complete integration of the material into the lattice structure.

\* \* \* \* \*